(12) United States Patent
Brunson et al.

(10) Patent No.: US 10,189,200 B2
(45) Date of Patent: Jan. 29, 2019

(54) TOOLING, SYSTEM, AND PROCESS FOR INJECTION STRETCH BLOW MOLDED CONTAINER WITH INTEGRAL HANDLE

(71) Applicant: R&D Tool & Engineering Co., Lees Summit, MO (US)

(72) Inventors: Dave Brunson, Raymore, MO (US); Michael J. Wilkerson, Kansas City, MO (US); Brian Lefebure, Lees Summit, MO (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 593 days.

(21) Appl. No.: 14/808,786

(22) Filed: Jul. 24, 2015

(65) Prior Publication Data

US 2017/0021551 A1    Jan. 26, 2017

(51) Int. Cl.
*B29C 49/12*    (2006.01)

(52) U.S. Cl.
CPC .................................... *B29C 49/12* (2013.01)

(58) Field of Classification Search
CPC ........................ B29C 49/0073; B29C 49/482
USPC ........................................................ 425/525
See application file for complete search history.

(56) References Cited

U.S. PATENT DOCUMENTS

| 4,038,006 | A | * | 7/1977 | Farrell | ................... B29C 49/16 425/525 |
|---|---|---|---|---|---|
| 4,280,805 | A | | 7/1981 | Hafele | |
| 4,311,246 | A | | 1/1982 | Saito et al. | |
| 4,372,454 | A | | 2/1983 | Thompson | |
| 4,629,598 | A | | 12/1986 | Thompson | |
| 5,508,076 | A | | 4/1996 | Bright | |
| 5,647,930 | A | | 7/1997 | Bright | |
| 6,789,689 | B1 | | 7/2004 | Beale | |
| 6,896,943 | B1 | | 5/2005 | Beale | |
| 7,150,371 | B1 | | 12/2006 | Larson et al. | |
| 8,524,143 | B2 | | 9/2013 | Thibodeau | |
| 8,550,272 | B2 | | 10/2013 | Yourist | |
| 8,574,486 | B2 | | 11/2013 | Jaksztat et al. | |
| 2009/0243161 | A1 | | 10/2009 | Beale | |

* cited by examiner

*Primary Examiner* — Christina A Johnson
*Assistant Examiner* — Xue H Liu
(74) *Attorney, Agent, or Firm* — Hovey Williams LLP

(57) ABSTRACT

Stretch blow station tooling for stretch blowing at least one parison into a molded article, with such parison including a handle. The tooling comprises at least one blow mold assembly including first and second blow mold halves shiftable between an open position and a closed position. The first and second blow mold halves each include a body cavity surface formed therein. In the closed position, the body cavity surfaces of the first and second blow mold halves are aligned to define a blow cavity for receiving at least a portion of the parison. The tooling further comprises a plunger assembly including a plunger configured to be selectively positioned within the blow cavity. When the plunger is positioned within the blow cavity, the plunger is configured to contact the handle of the parison.

12 Claims, 11 Drawing Sheets

TOOLING, SYSTEM, AND PROCESS FOR INJECTION STRETCH BLOW MOLDED CONTAINER WITH INTEGRAL HANDLE

BACKGROUND OF THE INVENTION

1. Field of the Invention

Embodiments of the present invention relate to an injection stretch blow mold tooling, system, and process. In particular, embodiments of the present invention relate to a tooling, a system, and a process for forming articles, such as containers, having integral handles.

2. Description of Related Art

Injection stretch blow molding (ISBM) is a technique used to create various articles, such as plastic bottles or other containers. ISBM processes are performed with an ISBM machine, which broadly performs the following steps: injection molding a resin into one or more parisons of desired shape, conditioning the parisons in preparation for stretch blow molding, stretch blow molding the parisons into final molded articles, and ejecting the molded articles from the ISBM machine. ISBM machines are generally provided in two types, 3-stage or 4-stage. A 4-stage ISBM machine will generally include an injection station for injection molding the resin into a parison, a conditioning station for conditioning the parison (e.g., applying heat to portions of the parison), a stretch blow station for stretch blow molding the parison into final molded articles, an ejection station for ejecting the molded article from the ISBM machine, and a rotation plate for transferring the parison and/or the molded article between each of the stations of the ISBM machine. A 3-stage ISBM machine differs from the 4-stage machine in that the 3-stage machine may not include a conditioning station.

Typically, the molded articles formed by the ISBM machine are containers. Such containers will often be manufactured in the form of plastic bottles, with such bottles having a main body and a neck extending up from the main body. Certain bottles may preferably include integral handles that will facilitate the handling and transportation of the bottles. Furthermore, some bottles may be configured to hold significant amounts of fluid or other materials. In such instances, it may be necessary for the integral handles of such bottles to be attached to the bottles at two connection points, so as to provide for enhanced support during handling and transportation. However, for bottles made via ISBM, such as bottles formed from PET, it is difficult to form integral handles that are connected to the bottles at two connection points.

For example, it is inherently difficult to injection mold a parison having an integral handle. Certain known processes are used in which a main body of a parison and a handle are formed separately. The body and the handle may then be subsequently connected together. However, the connection points between such separately formed handle and parison lack the inherent strength of an integrally-formed handle. Next, even if a parison can be injection molded with an integral handle connected to the parison at two points, it is difficult to satisfactorily stretch blow the parison into a container. Such difficulty is due to the handle interfering with and/or obstructing the stretch blow tooling and process.

As such, it would be desirable to have ISBM tooling, systems, and processes for producing molded articles (e.g., containers) with integral handles, and in particular, for producing molded articles that include integral handles that are secured to the molded articles at two connection points.

SUMMARY OF THE INVENTION

Embodiments of the present invention include stretch blow station tooling for stretch blowing at least one parison into a molded article, with such parison including a handle. The tooling comprises at least one blow mold assembly including first and second blow mold halves shiftable between an open position and a closed position. The first and second blow mold halves each include a body cavity surface formed therein. In the closed position, the body cavity surfaces of the first and second blow mold halves are aligned to define a blow cavity for receiving a portion of the parison. The tooling further comprises a plunger assembly including a plunger configured to be selectively positioned within the blow cavity. When the plunger is selectively positioned within the blow cavity, the plunger is configured to contact the handle of the parison.

Embodiments of the present invention additionally include a stretch blow station tooling for stretch blowing at least one parison into a molded article, with such parison including a handle. The tooling comprises at least one blow mold defining a blow cavity for receiving at least a portion of the parison. The tooling further comprises a plunger assembly attached to the blow mold and including a plunger for being selectively positioned within the blow cavity. When the plunger is positioned within the blow cavity, the plunger is configured to contact the handle of the parison.

Embodiments of the present invention further include a process for forming at least one injection stretch blow molded container from a parison, with the container including a handle coupled to the container at two or more locations. The process comprises the initial step of inserting at least a portion of the parison within a blow cavity of stretch blow tooling of an injection stretch blow molding machine. An additional step includes extending a plunger within the blow cavity to engage the plunger with an end portion of the handle. An additional step includes bending the end portion of the handle away from the plunger. An additional step includes stretch blowing the parison to form the container, such that the end portion of the handle is force back against the plunger. A further step includes retracting the plunger from within the blow cavity and removing the container from the stretch blow tooling.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein.

Figure 1:
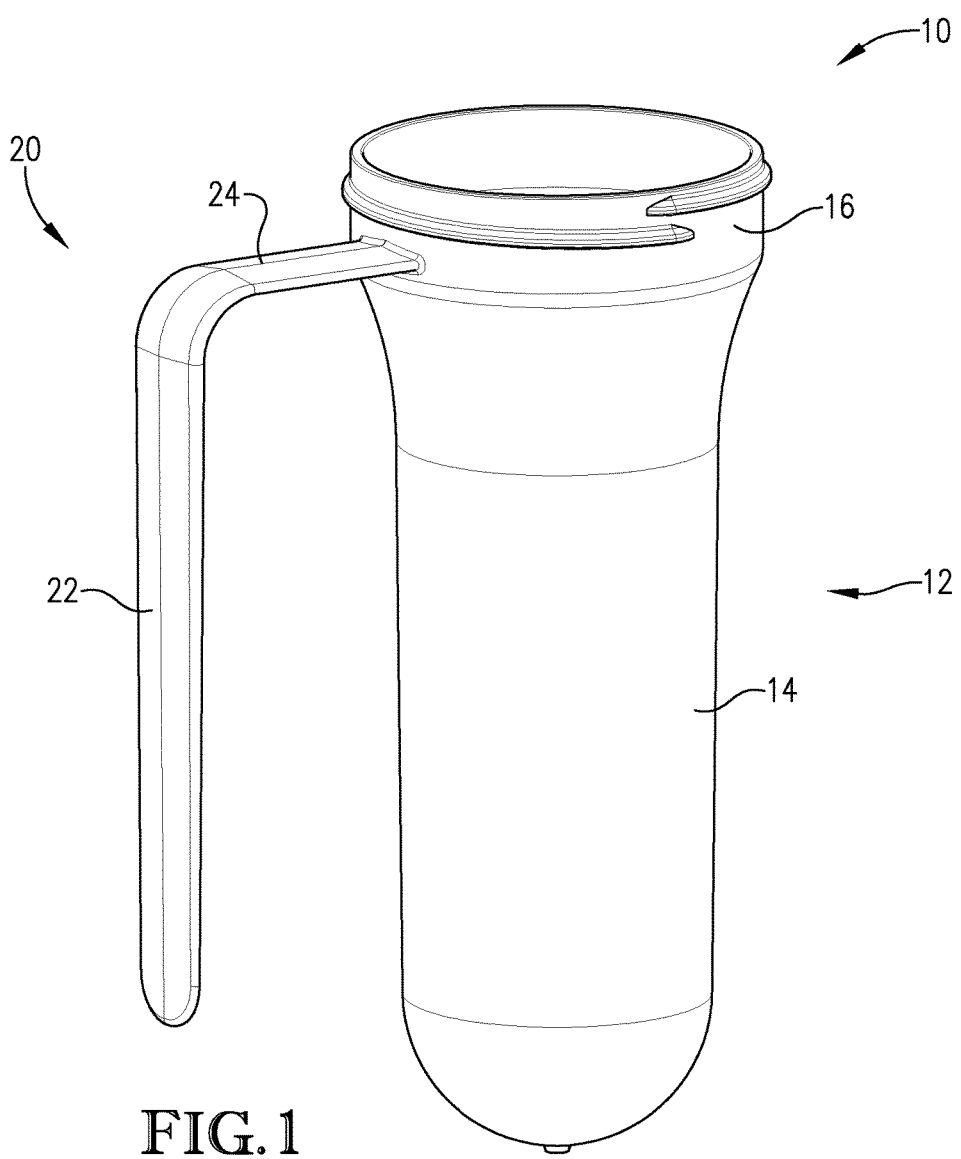
FIG. 1 is a perspective view of a parison with an integral handle.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention are directed to tooling, systems, and processes for use with ISBM machines. However, it is to be appreciated that the principles of the present invention are not limited to the ISBM machines. The principles of the present invention may be beneficially applied to any container-forming machine having tooling for a stretch blow station, as described below.

ISBM machines used in embodiments of the present invention may be similar to the ISBM machine described and illustrated in U.S. Pat. No. 7,381,045, entitled "QUICK CHANGE BLOW MOLD TOOLING," which is incorporated by reference herein in its entirety. In more detail, the ISBM machine may include an injection station comprising an injection nozzle that injects molten plastic material, such as PET, into mold cavities to form parisons. The parisons that are formed at the injection station are then carried by a rotation plate of the ISBM machine to a conditioning station for additional processing, such as heat treating. From the conditioning station, the parisons are transferred to a stretch blow station where the parisons are expanded by pressurized air and a stretch rod into final molded articles, such as full-sized bottles. Finally, the articles are transferred to an ejection station where the articles are discharged from the ISBM machine.

Embodiments of the present invention comprise stretch blow station tooling for forming a parison into a final molded article, with the final molded article including a handle. The parison formed into the final molded article may be formed from PET and may include an integral handle, such as the parison 10 illustrated in FIG. 1. Such a parison 10 may be formed using injection station tooling as described in U.S. patent application Ser. No. 14/491,243, filed on Sep. 19, 2014, and entitled "TOOLING AND PROCESS FOR INJECTION STRETCH BLOW MOLDED CONTAINER WITH INTEGRAL HANDLE," the entire disclosure of which is incorporated by reference herein. With reference to FIG. 1, the parison 10 may be formed with a body 12 having a main portion 14 and neck portion 16 extending upward from the main portion 14. In addition, the parison 10 may include a handle 20 extending from the parison 10 at a single connection point. The handle 20 may include a main portion 22 and a connection portion 24, with the connection portion 24 connecting the main portion 22 of the handle 20 to the neck portion 16 of the body 12 of the parison 10. As shown, the connection portion 24 may extend generally horizontally from the neck portion 16 of the body 12, so as to be perpendicular with the main portion 14 of the body 12 of the parison 10. Additionally, the main portion 22 of the handle 20 may extend generally vertically from the connection portion 24, so as to be generally parallel with the main portion 14 of the body 12 of the parison 10. In certain instances, the handle 20 may include an arcuate section linking the main portion 22 with the connection portion 24 of the handle 20.

Figure 2:
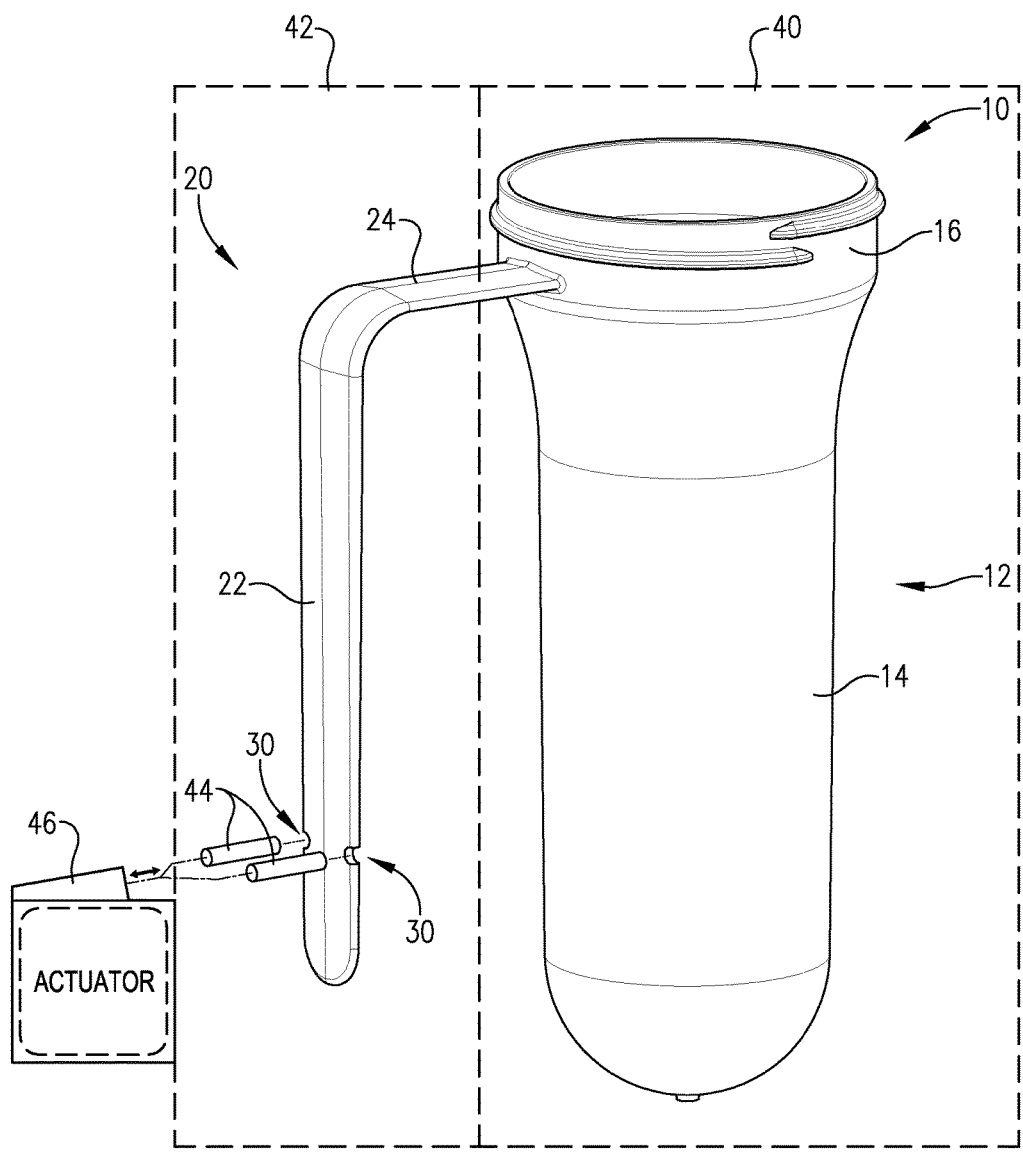
FIG. 2 is a perspective view of a parison with an integral handle and notches formed on the handle, with the parison received within a schematic depiction of molds of an injection station tooling, and with the injection station tooling including articulating pins controlled by an actuator.

In some embodiments, as illustrated in FIG. 2, the parison 10 will be formed with notches 30 on either or both sides of the main portion 22 of the handle 20. Such notches 30 may be formed in the injection station or in the conditioning station of the ISBM machine. For instance, as schematically illustrated in FIG. 2, the parison 10 may be formed in injection station tooling that includes a body mold 40 and a handle mold 42. The parison 10 may generally be formed as described in the above-referenced '243 Patent Application. To form the notches 30 according to embodiments of the present invention, the injection station tooling may include one or more articulating pins 44 configured to be articulated by an actuator 46, such as a linear actuator. In more detail, before resin is injected into the molds 40, 42 of the injection station tooling, the articulating pins 44 can be actuated, via the actuator 46, to a position inside the handle mold 42. As such, once the resin is injected into the molds 40, 42, the resin will flow around the pins 44, thereby forming the notches 30. Once the resin sufficiently cools and hardens, the articulating pins 44 can be actuated, via the actuator 46, to a position outside of the handle mold 42. Thereafter, the parison 10 with the notches 30 formed on its handle 20 can be removed from the injection station tooling and transferred to the conditioning station and/or the stretch blow station for further processing.

Figure 3:
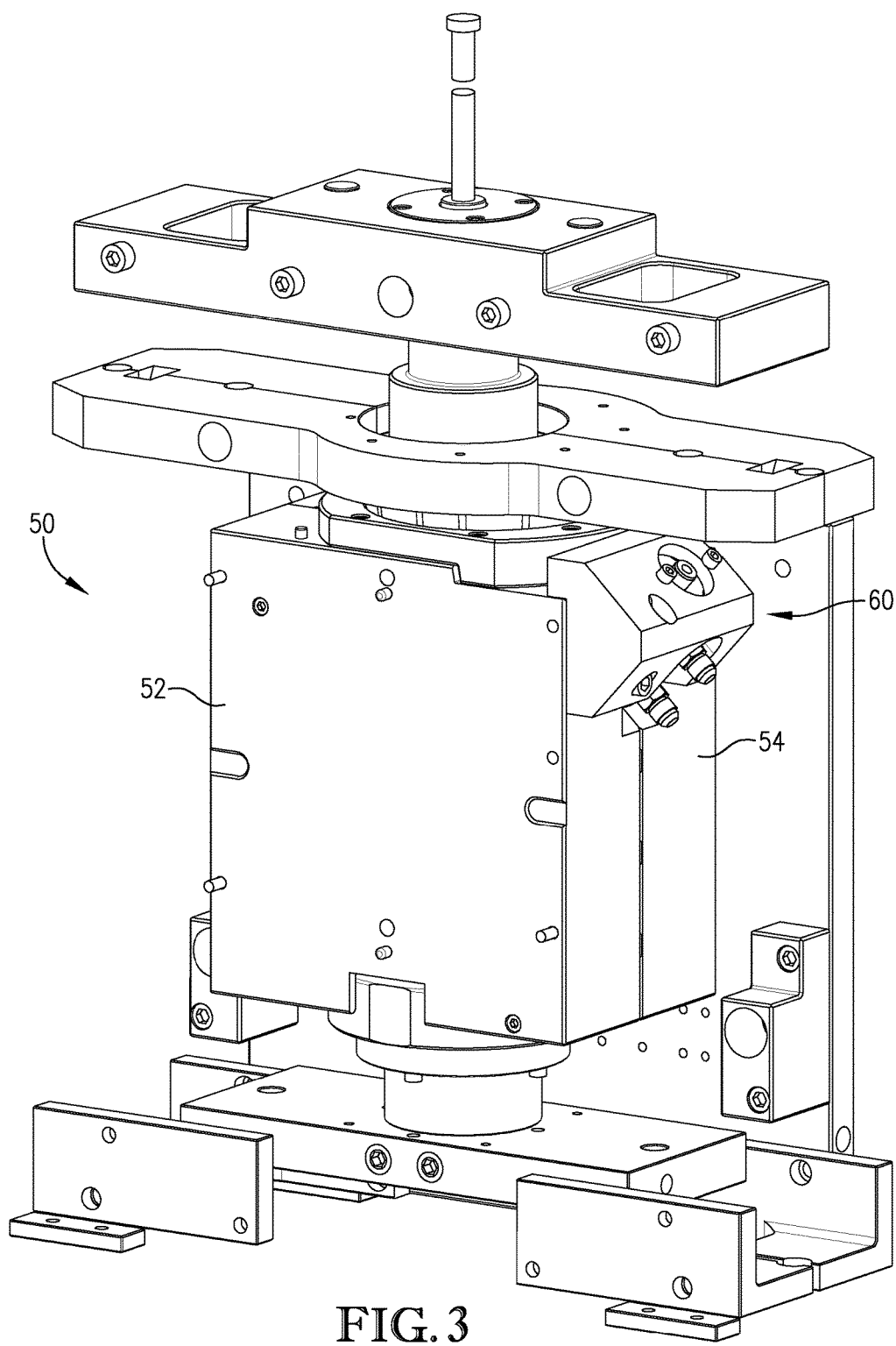
FIG. 3 is a perspective view of stretch blow mold tooling according to embodiments of the present invention, particularly illustrating first and second blow mold halves and a plunger assembly.
Figure 4:
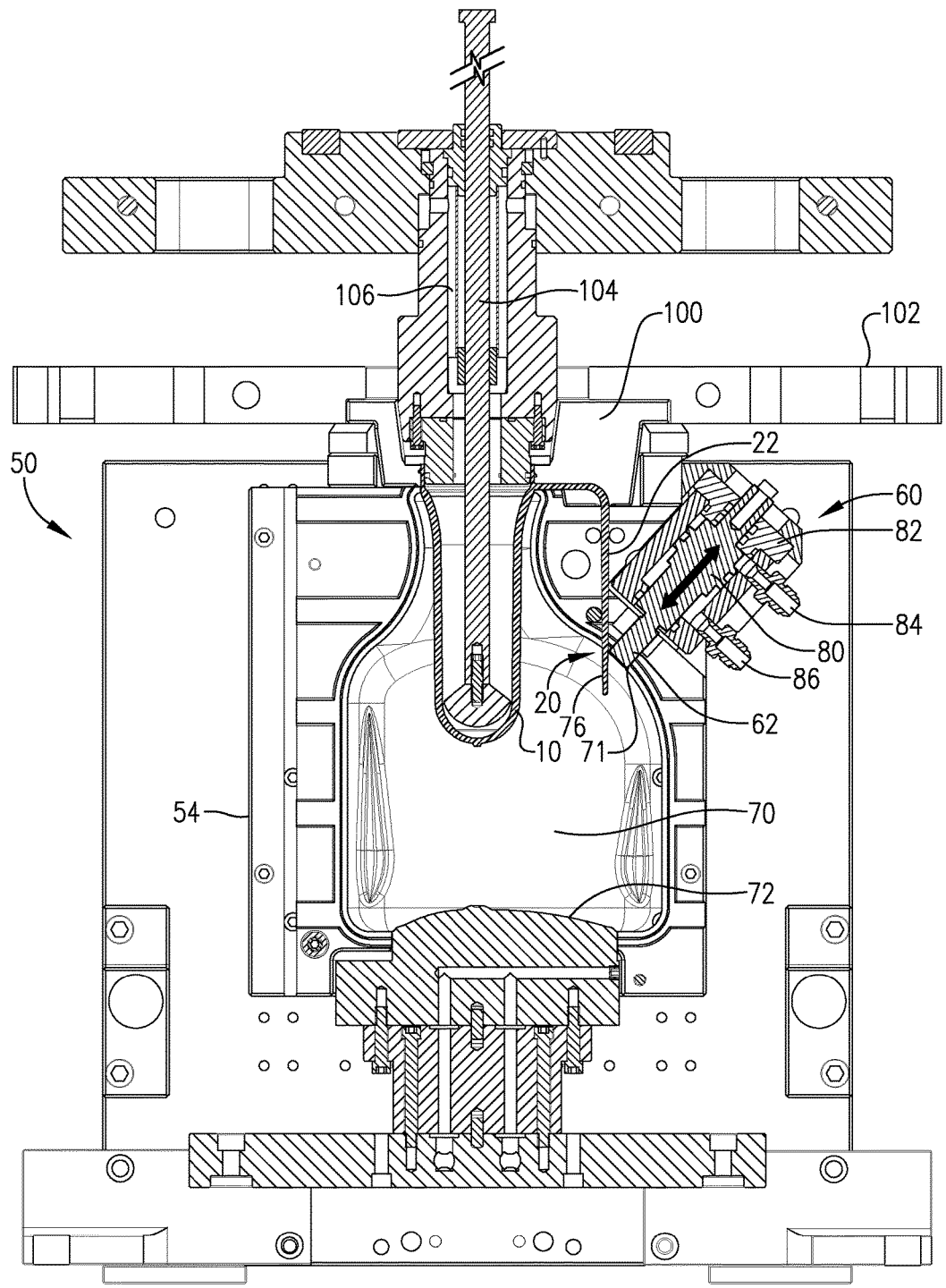
FIG. 4 is an elevational cross-section view of the stretch blow tooling of FIG. 3, particularly showing a parison received within a blow cavity and further illustrating the plunger assembly with a piston in a retracted position.

Referring now to FIG. 3, the stretch blow tooling of embodiments of the present invention is identified with reference numeral 50 and may comprise a blow mold assembly with first and second blow mold halves 52, 54 configured to alternate from an open position to a closed position and configured to receive a parison 10 therebetween (parison 10 not shown in FIG. 3). With reference to FIGS. 3-4, the stretch blow tooling 50 further comprises a plunger assembly 60 configured to selectively extended a plunger 62 into contact with the handle 20 of the parison 10, with such parison 10 being positioned between the first and second mold halves 52, 54.

Figure 5:
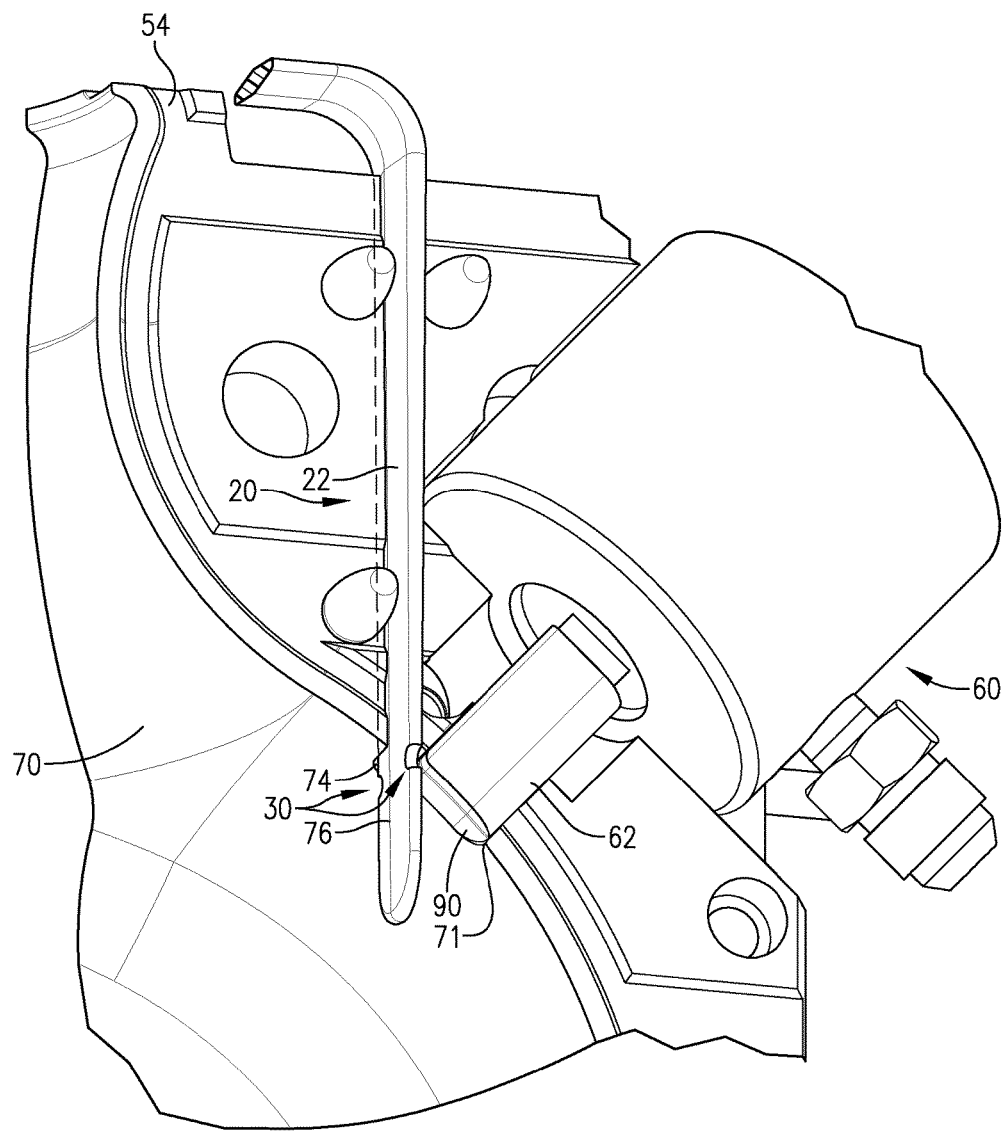
FIG. 5 is a partial perspective view of the cross-section of FIG. 4, particularly showing the piston of the plunger assembly in a refracted position, and a plunger of the plunger assembly positioned adjacent to a handle of the parison.

In more detail, the first and second blow mold halves 52, 54 each have a body cavity surface 70 formed therein (only the body cavity surface 70 of second blow mold half 54 is shown in FIG. 4). When first and second blow mold halves 52, 54 are in their closed positions, the directly opposed body cavity surfaces 70 cooperate to define a blow cavity. The blow cavity will have a shape that corresponds to an intended shape of the final molded article. With reference to FIGS. 4-5, the blow cavity may include a plunger opening 71, as defined by the blow mold halves 52, 54, which allow the plunger 62 to be selectively extended and refracted within the blow cavity. In certain embodiments, the blow station tooling 50 is also provided with a bottom mold surface 72 (See FIG. 4) that cooperates with the body cavity surfaces 70 to define a closed bottom portion of the blow cavity. The bottom mold surface 72 may function to form a corresponding upwardly arched cavity, or dome, in a bottom portion of the final molded article produced within the mold cavity. Although the description provided herein details a single blow mold assembly, it is understood that the stretch blow tooling 50 may include a plurality of blow mold assemblies, such that the stretch blow tooling 50 is operable to simultaneously stretch blow mold a plurality of molded articles having integral handles.

In some embodiments, as shown in FIG. 5, the first and second blow mold halves 52, 54 of the stretch blow tooling 50 will each additionally include a handle-supporting channel 74 (only the handle-supporting channel 74 of second blow mold half 54 is shown in FIG. 5). When the first and second blow mold halves 52, 54 are in their closed position, the directly opposed handle-supporting channels 74 cooperate to define a handle-supporting cavity. In some embodiments, such as illustrated in FIGS. 4-5, the handle-supporting cavity, as defined by the handle-supporting channels 74, may extend down from a top portion of the stretch blow tooling 50 and into communication with the blow cavity. In certain embodiments, the handle-supporting cavity of the stretch blow tooling 50 will only be long enough to receive a portion of the main portion 22 of the handle 20 of the parison 10. In such embodiments, the handle-supporting cavity of the stretch blow tooling 50 may have a length that allows for an end portion 76 of the handle 20 of the parison 10 to extend within the blow cavity of the stretch blow tooling 50. As used herein, the term "end portion" 76 of the handle 20 refers to the portion of the handle 20 that extends within the blow cavity from the handle-supporting channel 74 (See, e.g., FIGS. 4-5). As apparent from FIG. 5, the end portion 76 of the handle 20 may alternatively be defined as the portion of the handle 20 extending below the notches 30. As will be described below, by allowing the end portion 76 of the handle 20 to be positioned within the blow cavity, the plunger 62 can be extended to engage and to bend the end portion 76 of the handle 20 inward such that the body 12 of the parison 10 can be stretch blown in a manner that causes the final molded article to be stretch blown around the end portion 76 of the handle 20. As such, the end portion 76 of the handle 20 can be secured to the body of the molded article, thus, providing for the handle 20 to be coupled to the body of the final molded article at two connection points.

Figure 6:
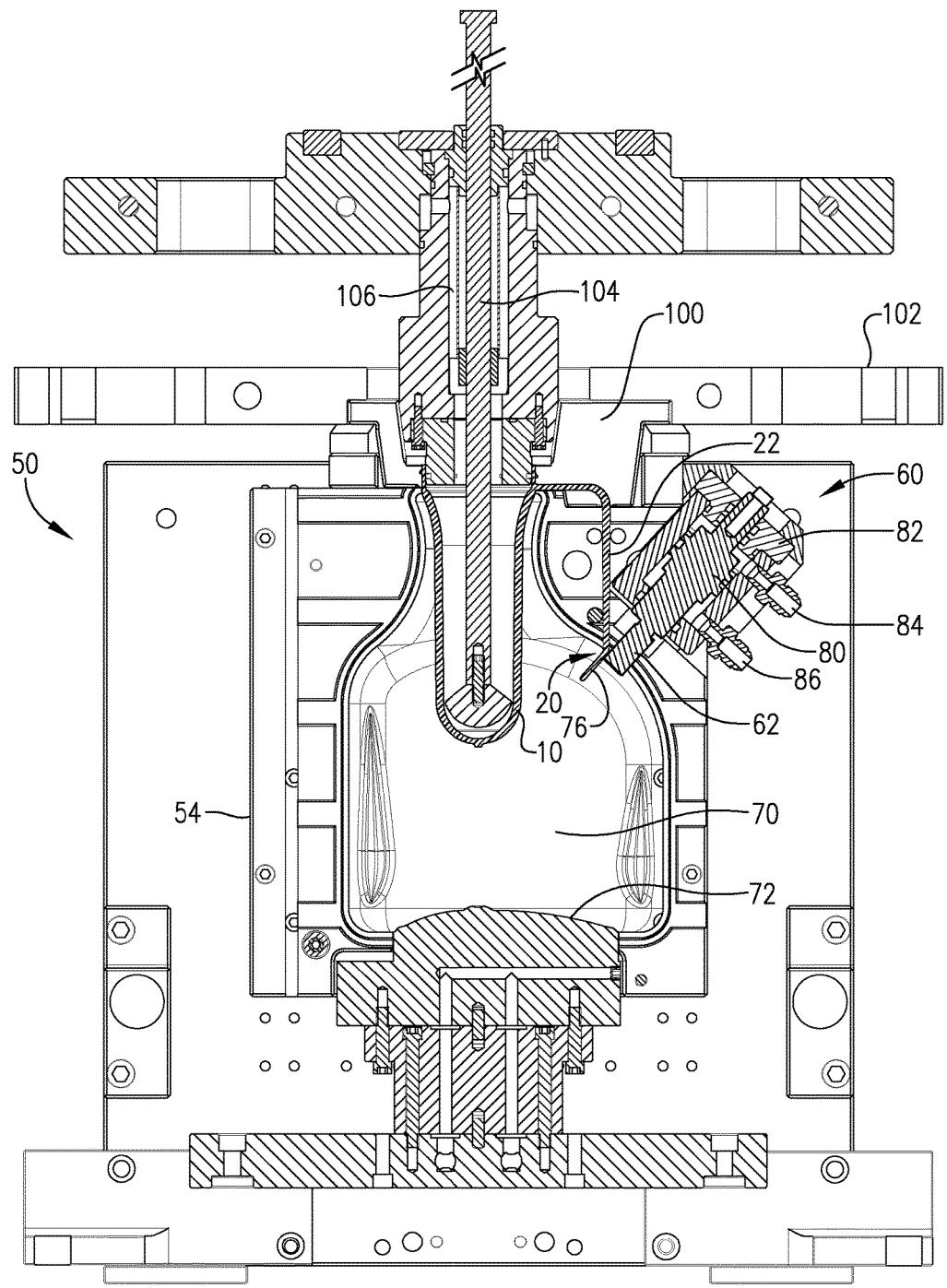
FIG. 6 is an elevational cross-section view of the stretch blow tooling of FIG. 3, particularly showing a parison received within a blow cavity and further illustrating the plunger assembly with a piston in the extended position.

Turning to the plunger assembly 60 in more detail, and with particular reference to FIGS. 4 and 6, the plunger assembly 60 may comprise a double-acting piston cylinder that includes a piston 80 housed within a cylinder 82. The plunger 62 extends proximally away from the piston 80. As used herein, the term "proximal" refers to a direction towards the blow cavity, while the term "distal" refers to a direction away from the blow cavity. In some embodiments, the plunger 62 may be integrally formed with the piston 80. The plunger assembly 60 further comprises an inlet port 84 and an exhaust port 86. The inlet port 84 is positioned distally from the exhaust port 86. In some embodiments, as shown in the figures, the plunger assembly 60 may be pneumatic. However, in other embodiments, the plunger assembly 60 may be hydraulically, mechanically, and/or electrically operated.

Returning to the embodiments illustrated in the figures, the plunger assembly 60 will be secured to an upper portion of the mold halves 52, 54. In particular, as shown in FIGS. 3-4, the plunger assembly 60 may be positioned on a side of the mold halves 52, 54 adjacent to the handle-supporting channels 74, such that the plunger 62 is positioned adjacent to and the end portion 76 of the handle 20 of the parison 10, when the parison 10 is received within the blow cavity of the stretch blow tooling 50.

With the piston 80 in a retracted position, as shown in FIGS. 4-5, fluid (e.g., air) can be injected into the cylinder 82 via the inlet port 84. With the exhaust port 86 open, the pressure of the injected fluid will cause a force against the piston 80, which causes the piston 80 to actuate proximally to an extended position, as is shown in FIG. 6. As such, the plunger 62 is actuated proximally, inside the blow cavity. Alternatively, with the piston 80 in the extended position (as shown in FIG. 6), fluid can be injected into the cylinder 82 via the exhaust port 86. With the inlet port 84 open, the pressure of the injected fluid will cause a force against the piston 80, so as to actuate the piston 80 distally to the retracted position, as is shown in FIG. 4. As such, the plunger 62 will be forced out of the blow cavity. In some alternative embodiments, fluid will not need to be injected into the cylinder 82 via the exhaust port 86 to retract the piston 80. In some such embodiments, a pressure within the blow cavity, such as from stretch blow molding operations discussed in more detail below, will cause sufficient pressure on the plunger 62 to force the piston 80 back to the retracted position. To accomplish such, at least the inlet port 84 should be open to allow the piston 80 to retract.

Turning now to the plunger 62 in more detail, as described above, the plunger 62 extends proximally from the piston 80. As shown in FIG. 5, a proximal end (free end in FIG. 5) of the plunger 62 presents plunger face 90 that is configured to be directed towards the end portion 76 of the handle 20 of the parison 10. In some embodiments, the plunger assembly 60 will be positioned with respect to the mold halves 52, 54 such that the plunger face 90 is generally parallel with a portion of the body cavity surfaces 70 adjacent to and/or surrounding the plunger opening 71. As such, when the piston 80 is in the retracted position (as shown in FIG. 5), the plunger face 90 of the plunger 62 operates in conjunction with the body cavity surfaces 70 so as to define the blow cavity.

Figure 7:
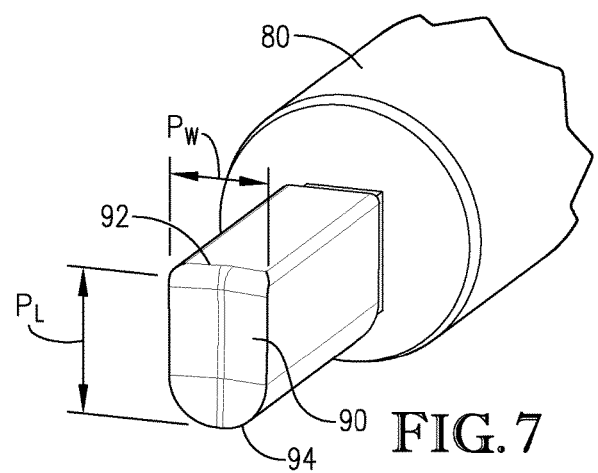
FIG. 7 is a partial perspective view of a plunger of the plunger assembly of FIGS. 4-6, particularly illustrating a plunger face of the plunger.

Some embodiments of the present invention provide for the plunger face 90 to include a shape that corresponds with a shape of the end portion 76 of the handle 20. In more detail, as illustrated in FIG. 7, the end plunger face 90 may have "U" shape, with a base side 92 and an at least partially arcuate side 94. Such a shape may correspond to the end portion 76 of the handle 20, which may have a corresponding arcuate shape. Furthermore, in some embodiments, as shown in the drawings, the end plunger face 90 may have a concave surface that bends inwards, distally towards the piston 80. In other embodiments, the end plunger face 90 may be generally flat. Although the shape of the plunger face 90 may correspond with the shape of the end portion 76 of the handle 20, the plunger face 90 may have a size that is at least slightly smaller than a size of the end portion 76 of the handle 20, as will be described in more detail below.

With the stretch blow tooling 50 described above, a final molded article with an integral handle can be stretch blown from a parison 10. To begin, as shown in FIG. 4, the parison 10 is inserted, via a thread lock assembly 100 and a carrier plate 102, between the first and second blow mold halves 52, 54. Specifically the body 12 of the parison 10 is positioned between the blow mold halves 52, 54 and the handle 20 of the parison 10 is positioned between the handle-supporting channels 74. The first and second blow mold halves 52, 54 are then actuated to their closed position.

Next, the piston 80 of the plunger assembly 60 is actuated to its extended position, as shown in FIG. 6, thereby causing the plunger 62 to extend within the blow cavity and into contact with the end portion 76 of the handle 20. The plunger 62 is configured to extend within the blow cavity to such an extent that the end portion 76 of the handle 20 is bent inward toward the main body 12 of the parison 10. In some embodiments, the plunger 62 will extend within the blow cavity between 0.1 to 0.75 inches, between 0.2 to 0.5 inches, between 0.3 to 0.4 inches, or about 0.375 inches. As such, the plunger 62 is configured to bend the end portion 76 of the handle 20 towards the body 12 of the parison 10 (i.e., away from the plunger 62). The end portion 76 of the handle may, in some embodiments, be bent generally about the notches 30 of the handle 20. Such a bending may be at an angle of between 15 to 90 degrees, between 25 and 75 degrees, between 35 and 60 degrees, or about 45 degrees with respect to the main portion 22 of the handle 20. It is understood that the end portion 76 of the handle 20 is configured to efficiently bend because the parison 10 retains some heat from the injection molding and/or the conditioning steps previously performed by the ISBM machine.

Upon the end portion of the handle 20 being bent, a stretch rod 104 (See FIG. 6) is inserted within the body 12 of the parison 10. Embodiments provide for the stretch blow tooling 50 to impart both radial and axial stretching to the parison 10. In particular, the stretch rod 104 is inserted down within the body of the parison 10 while air is simultaneously blown from a blow core 106 into the parison 10. As such, the stretch blow station tooling 50 will stretch the parison 10 both axially and radially.

Figure 8:
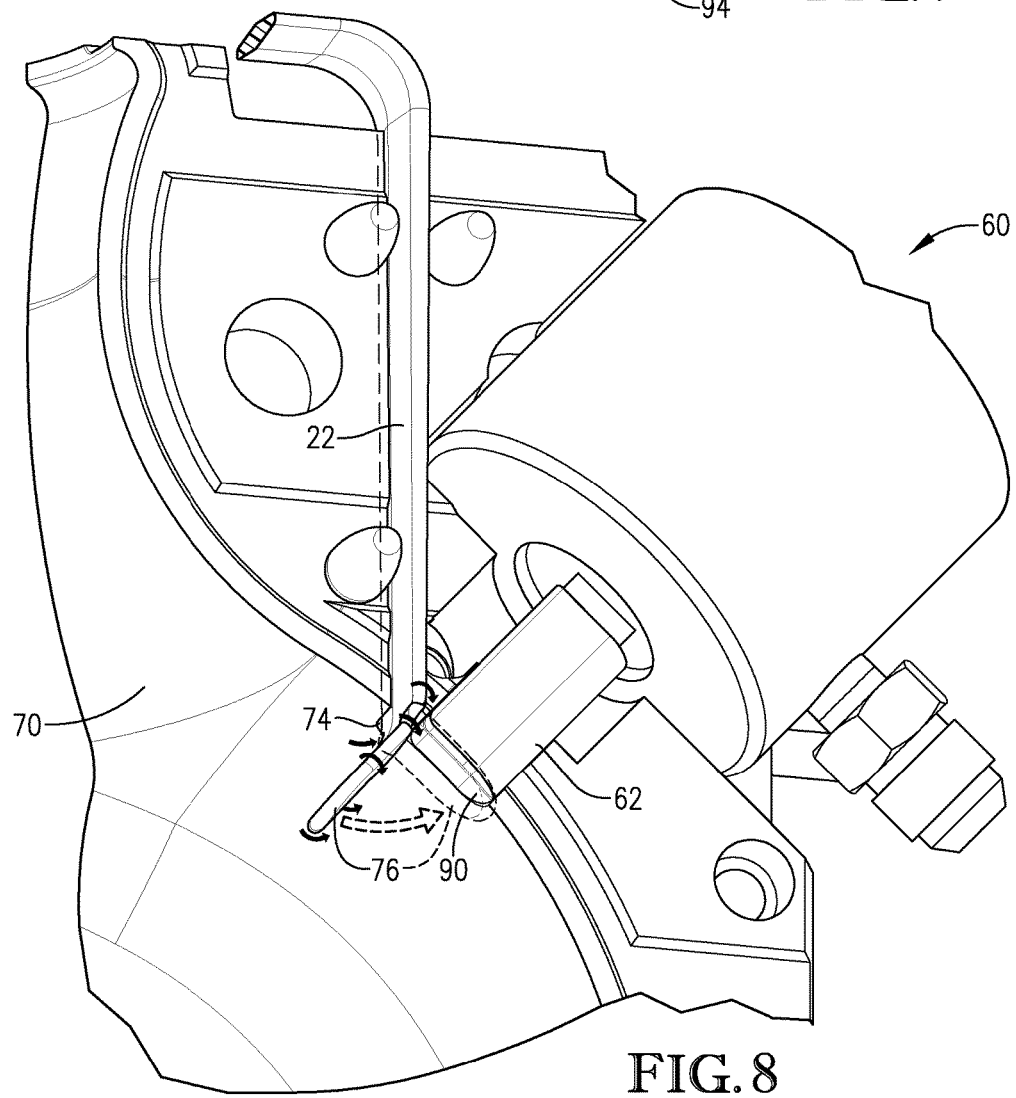
FIG. 8 is a partial perspective view of the cross-section of FIG. 6, particularly showing the piston in the extended position, a plunger of the plunger assembly positioned adjacent to a handle of the parison, and an end portion of the handle being bent inward away from the plunger.
Figure 9:
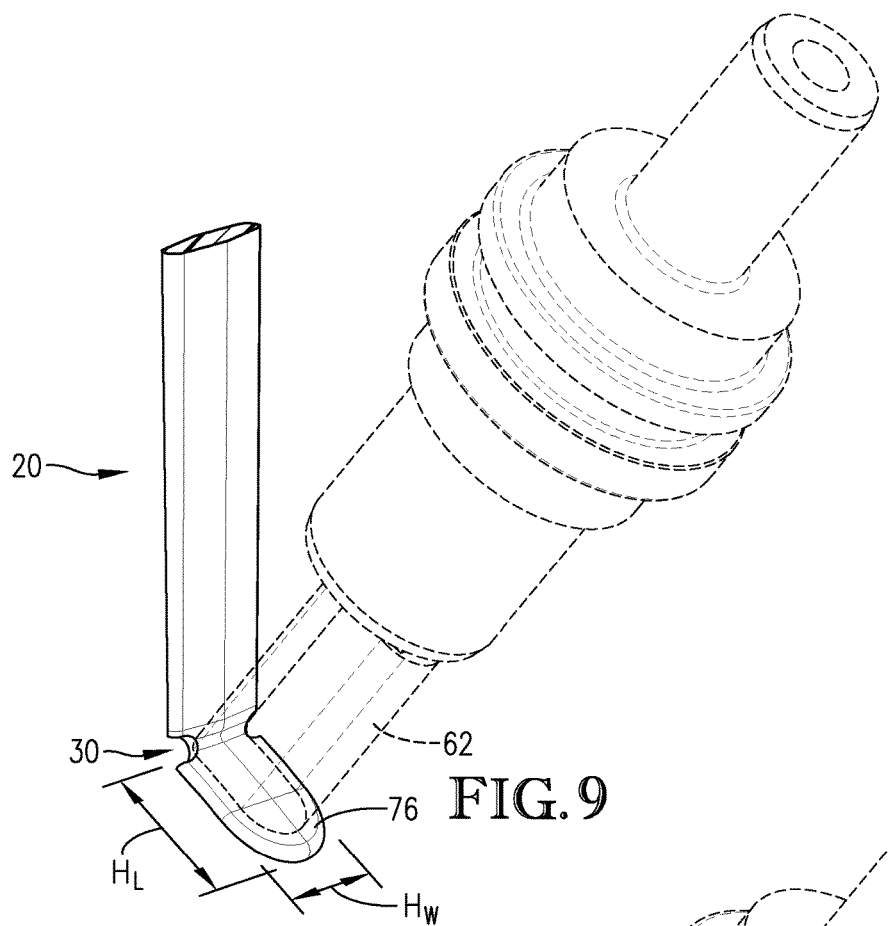
FIG. 9 is a partial perspective view of the end portion of the parison handle from FIG. 8 being positioned back against a plunger face of the plunger.
Figure 10:
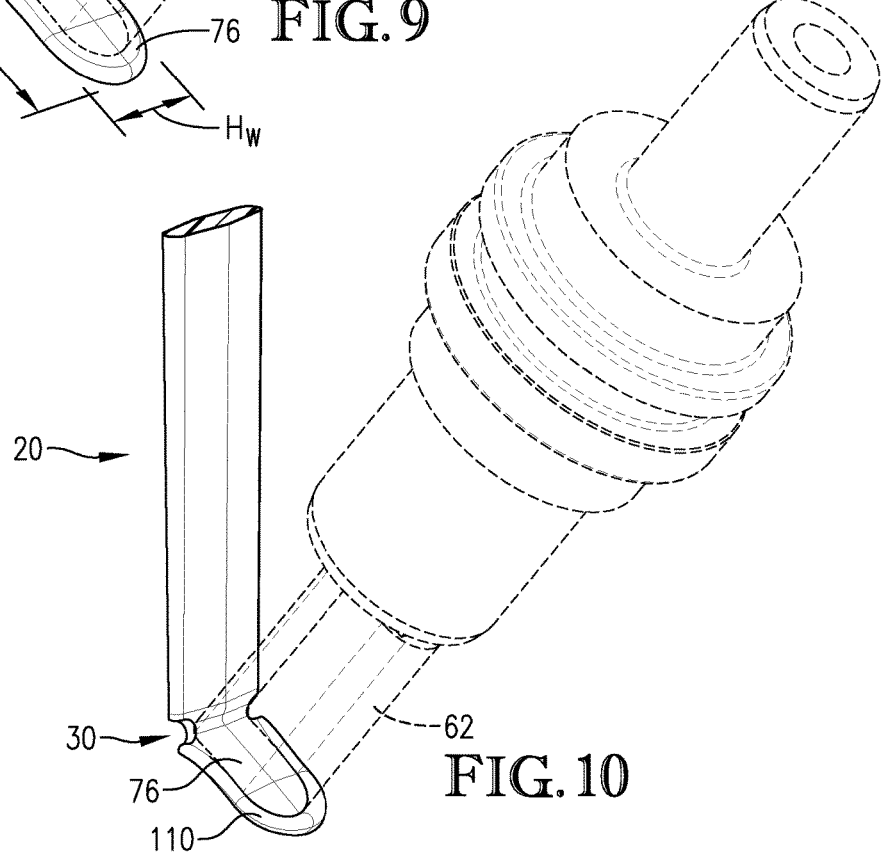
FIG. 10 is a partial perspective view of the end portion of the parison handle from FIG. 9 being positioned further back against the plunger face of the plunger, thereby creating an overlapping rim that overlaps the plunger face.

Beneficially, embodiments of the present invention provide for the body 12 of the parison 10 to be blown around the end portion 76 of the handle 20 such that handle 20 is secured to the molded article at two connection points (e.g., at the neck and the body). In more detail, as illustrated in FIGS. 8-10, as the parison 10 is stretch blown, a portion of the body 12 of the parison 10, which is being stretch blown outward, is forced into contact with the end portion 76 of the handle 20, which has been extended within the blow cavity and which has been bent inward toward the body 12 of the parison 10. As the parison 10 is stretch blown, it forces the end portion 76 of the handle 20 back against the plunger 62, as is shown in FIG. 9. Specifically, the end portion 76 of the handle 20 is forced against the plunger face 90. The end portion 76 of the handle may, in some embodiments, be bent generally about the notches 30 of the handle 20 so as to be forced against the plunger face 90. As briefly noted above, embodiments of the present invention provide for the plunger face 90 to include dimensions that are at least slightly less than the dimensions of the end portion 76 of the handle 20. An illustration of such dimensional differences is shown in FIG. 9, which shows the end portion 76 of the handle being forced back against the plunger face 90 of the plunger 62. In some specific embodiments, the plunger face 90 may have a width Pw (measured as length of the base side 92—See, e.g., FIG. 7) of between 0.10 to 1 inch, between 0.25 to 0.75 inches, between 0.30 to 0.60 inches, or about 0.33 inches. Contrastingly, as shown in FIG. 9, the end portion 76 of the handle 20 may have a width Hw of between 0.20 to 1.5 inches, between 0.33 to 1.00 inches, between 0.40 to 0.80 inches, or about 0.50 inches. Additionally, the plunger face 90 may have a length P1 (measured as a largest distance from the base side 92 to the arcuate side 94—See, e.g., FIG. 7) of between 0.10 to 2 inches, between 0.25 to 1.50 inches, between 0.50 to 1.00 inches, or about 0.75 inches. Contrastingly, the end portion 76 of the handle 20 may be a length H1 of between 0.20 to 2.50 inch, between 0.40 to 2.00 inches, between 0.75 to 1.5 inches, or about 1.00 inches. Alternatively, in some embodiments, a surface area of the plunger face 90 will be no more than 99 percent, no more than 95 percent, no more than 90 percent, no more than 85 percent, no more than 80 percent, or no more than 75 percent of a surface area of a side face of the end portion 76 of the handle 20 that makes contact with the plunger 62, such as shown in FIG. 9.

Because the plunger face 90 has dimensions that are at least slightly less than the dimensions of the end portion 76 of the handle 20, when the end portion 76 of the handle 20 is stretch blown back into contact with the plunger face 90, edge portions of the end portion 76 of the handle 20 will be at least partially forced around the plunger face 90. Specifically, as shown in FIG. 10, the edge portions of the end portion 76 of the handle 20 will be caused to at least partially overlap the plunger face 90, thereby forming an overlapping rim 110. The amount of overlap by the end portion 76 (i.e., the size of the overlapping rim 110) will be dependent on various factors, such as the temperature of the handle 20, a thickness of the handle 20, and the pressure of the stretch blow process.

Figure 11:
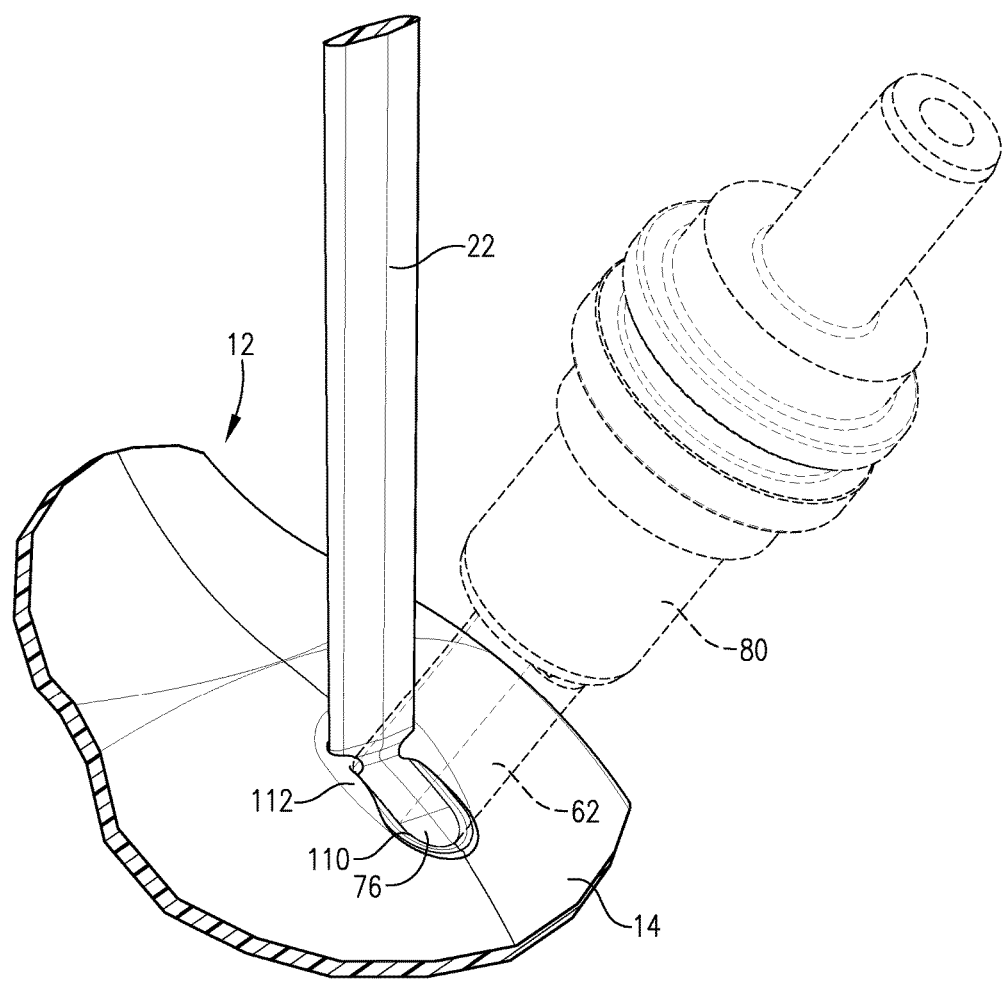
FIG. 11 is a partial perspective view of an overlapping portion of a body of the parison being blown around the overlapping rim of the parison handle of FIG. 10.

As the body 12 of the parison 10 continues to be stretch blown, an overlapping portion 112 of the main portion 14 of the body 12 of the parison 10 adjacent to the plunger 62 and the overlapping rim 110 will itself be caused to overlap the overlapping rim 110 of the end portion 76 of the handle 10, thereby engaging the stretch blown body 12 of the parison 10 (or molded article) with the end portion of the handle 20, as shown in FIG. 11. In addition, part of the overlapping portion 112 of the main portion 14 of the body 12 of the parison 10 may also be caused to overlap and/or fill within the notches 30 of the end portion 76 of the handle 10, thereby further engaging the stretch blown body 12 of the parison 10 with the end portion of the handle 20, as shown in FIG. 11. As such, the overlapping portion 112 of the main portion 14 of the body 12 operates to secure and lock the end portion 76 of the handle 20 in place. In particular, the overlapping portion's 112 engagement with the overlapping rim 110 will prevent the end portion 76 of the handle 20 from being forced upward from the stretch blown body 12 of the parison 10. Further, the overlapping portion's 112 engagement with the notches 30 will prevent the end portion 76 of the handle 20 from being forced laterally outward from the stretch blown body 12 of the parison 10.

Figure 12:
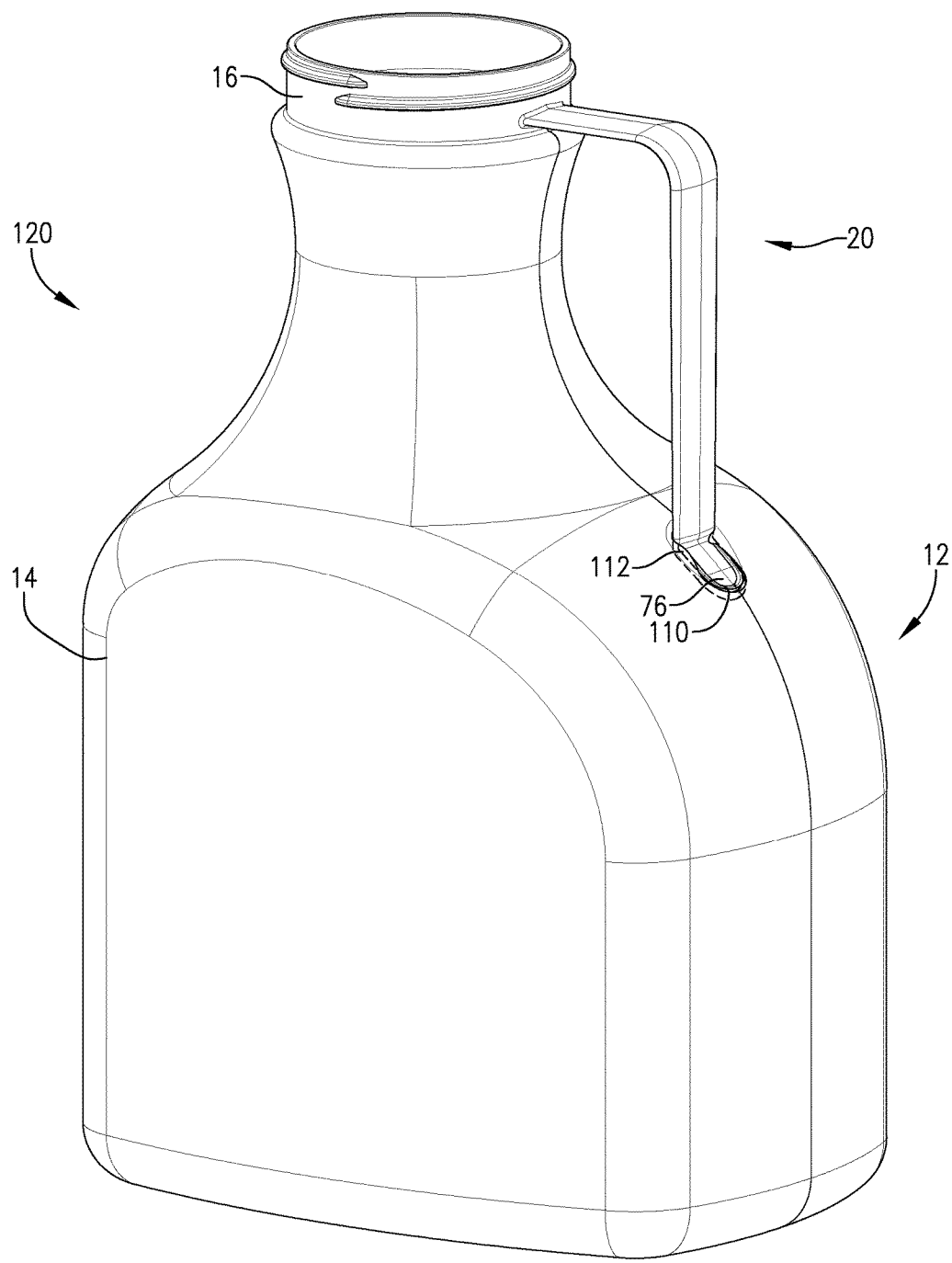
FIG. 12 is a perspective view of a final molded article according to embodiments of the preset invention, particularly illustrating a handle being secured to a body of the molded article at two connection points.
Figure 13:
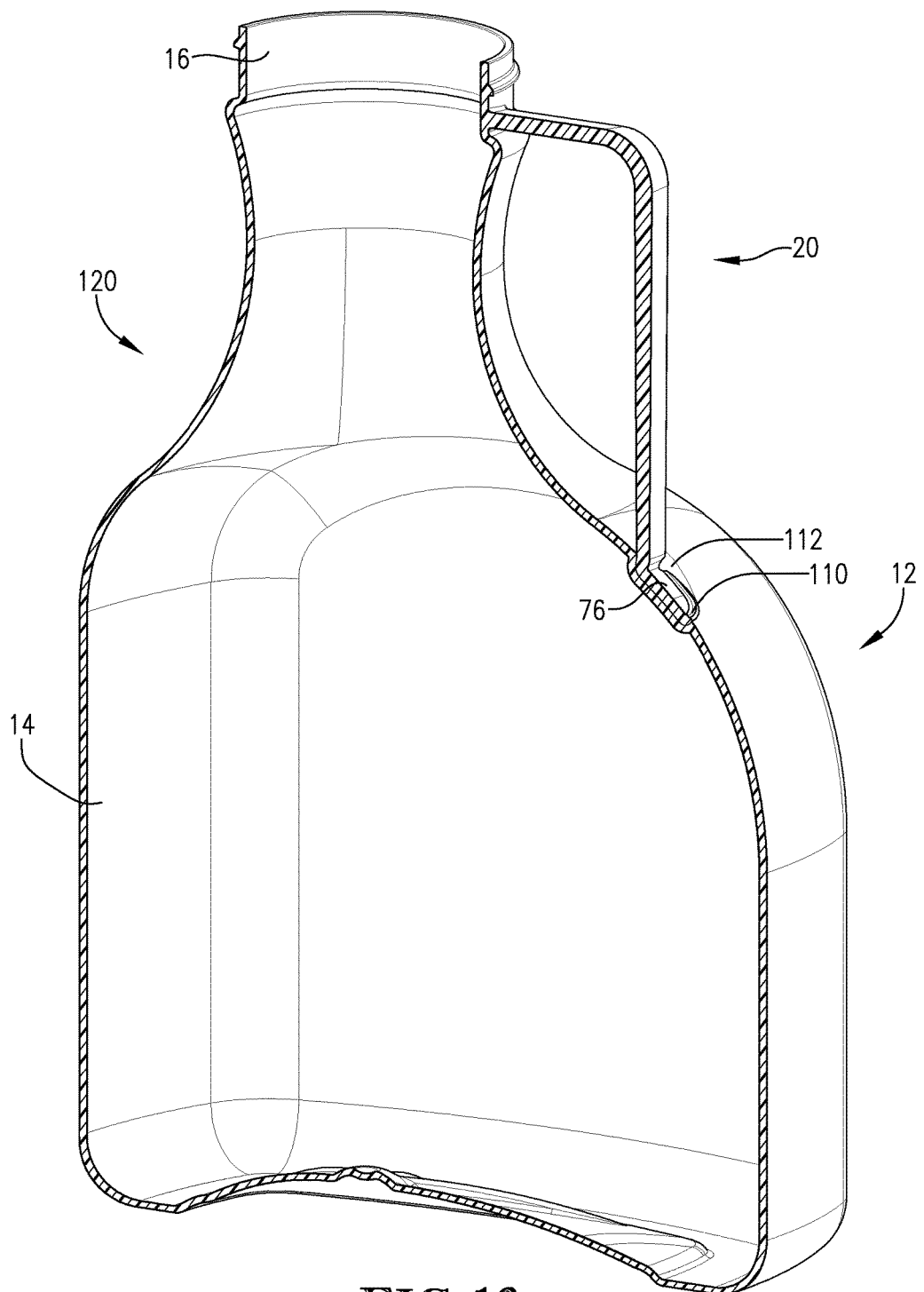
FIG. 13 is a perspective cross-section section of the final molded article of FIG. 12.

The actuation of the plunger assembly 60 may be controlled by a control system, such as by a programmable logic controller and/or by a timer. As such, once the overlapping rim 110 of the end portion 76 of the handle 20 is created by having the edge portions of the end portion 76 of the handle 20 overlap the plunger face 90, and once the overlapping portion 112 of the body 12 of the parison 10 has itself overlapped the overlapping rim 110 of the end portion 76 so as to engage the handle 20, the piston 80 of the plunger assembly 60 can be caused to retract to its retracted position. In such a retracted position, the parison 10 is free to continue to be stretch blown until a final molded article 120 is formed into a shape that corresponds with the blow cavity, such as illustrated in FIGS. 12-13. In some embodiments, the plunger assembly 60 may not need to be actuated into its retracted position via insertion of fluid into the cylinder 82 by way of the exhaust port 86. In some such embodiments, the force of the parison 10 being blown may be sufficient to cause the piston to be retracted (inlet port 84 may be required to be open in such embodiments).

Given the above, when the handle 20 of the parison 10 is formed with the overlapping rim 110, and when the overlapping portion 112 of the body 12 of the molded article 120 is caused to overlap the rim 110 and/or the notches 30, a secure engagement can be created between the end portion 76 of the handle 20 and the molded article 120. Thus, embodiments provide for the end portion 76 of the handle 20 to engage with the body 12 of the molded article 120 at two locations, such that the handle 20 is secured to the molded article 120 at two connection points (e.g., at the neck 16 and the main portion 14 of the body 12). Upon forming the molded article 120, the molded article 120 will be transferred to an ejection station, where the molded article 120 can be ejected from the ISBM machine.

Given the description provided above, embodiments of the present invention include a process for forming an injection stretch blow molded article 120 via an injection stretch blow molding machine, with such molded article 120 having an integral handle secured thereto at two connection points. Although the invention has been described with reference to the preferred embodiment illustrated in the attached drawing figures, it is noted that equivalents may be employed and substitutions made herein without departing from the scope of the invention as recited in the claims.

What is claimed is:

1. Stretch blow station tooling for stretch blowing at least one parison into a molded article, with such parison including a handle, said tooling comprising:
   at least one blow mold including first and second blow mold halves shiftable between an open position and a closed position,
   wherein said first and second blow mold halves each include a body cavity surface formed therein, and wherein said first and second blow mold halves each include a handle-supporting channel formed therein,
   wherein in the closed position, said body cavity surfaces of said first and second blow mold halves are aligned to define a blow cavity for receiving a main body of the parison, wherein in the closed position, said handle-supporting channels of said first and second blow mold halves are aligned to define a handle-supporting cavity for receiving a main portion of the handle,
   wherein when the parison is positioned within the blow mold, the main portion of the handle is received within the handle-supporting cavity and an end portion of the handle extends into the blow cavity; and
   a plunger assembly including a plunger configured to be selectively positioned within said blow cavity,
   wherein when said plunger is positioned within said blow cavity, said plunger is configured to contact the end portion of the handle of the parison so as to force the end portion of the handle towards the main body of the parison.

2. The tooling of claim 1, wherein the plunger is configured to contact the end portion handle of the parison so as to bend the end portion of the handle towards the main body of the parison between 35 to 60 degrees.

3. The tooling of claim 1, wherein the plunger includes a plunger face on its free end, with such plunger face configured to contact the end portion of the handle.

4. The tooling of claim 3, wherein the plunger is configured to be selectively positioned within said blow cavity by actuation through a plunger opening formed in portions of the first and/or second blow mold halves, wherein in an extended position, said plunger is positioned within said blow cavity, and wherein in a retracted position, said plunger is not positioned within said blow cavity.

5. The tooling of claim 4, wherein in the retracted position, the plunger face is generally parallel with a portion of the body cavity surfaces adjacent to the plunger opening, such that the plunger face forms part of the body cavity surfaces.

6. The tooling of claim 3, wherein the plunger face has a surface area that is no more than 90 percent of a surface area of a side face of the end portion of the handle that is directed at the plunger.

7. The tooling of claim 1, wherein the plunger assembly is powered mechanically, pneumatically, and/or hydraulically.

8. Stretch blow station tooling for stretch blowing at least one parison into a molded article, with such parison including a main body and a handle, said tooling comprising:
   at least one blow mold defining a blow cavity for receiving at the main body of the parison and a handle-supporting cavity for receiving a main portion of the handle; and
   wherein when the parison is positioned within the blow mold, the main portion of the handle is received within the handle-supporting cavity and an end portion of the handle extends into the blow cavity,
a plunger assembly attached to said blow mold and including a plunger for being selectively positioned within said blow cavity,
wherein when said plunger is positioned within said blow cavity, said plunger is configured to contact the end portion of the handle of the parison so as to force the end portion of the handle towards the main body of the parison.

9. The tooling of claim 8, wherein the plunger includes a plunger face on its free end, with such plunger face configured to contact the end portion of the handle.

10. The tooling of claim 9, wherein the plunger is configured to be selectively positioned within said blow cavity by actuation through a plunger opening formed in the blow mold, wherein in an extended position, said plunger is positioned within said blow cavity, and wherein in a retracted position, said plunger is not positioned within said blow cavity.

11. The tooling of claim 10, wherein in the retracted position, the plunger face is generally parallel with and adjacent to a portion of a body cavity surface of the blow mold, such that the plunger face forms part of the body cavity surface.

12. The tooling of claim 9, wherein said plunger face has a surface area that is no more than 90 percent of a surface area of a side face of the end portion of the handle that faces the plunger.

* * * * *